United States Patent Office 3,086,030
Patented Apr. 16, 1963

1

3,086,030
4,4-DIALKYL AND 4,4-DIARALKYL-3β,17β-DIHY-DROXY-ANDROSTANES AND DERIVATIVES THEREOF
Howard J. Ringold and George Rosenkranz, Mexico City, Mexico, assignors, by mesne assignments, to Syntex Corporation, a corporation of Panama
No Drawing. Filed June 24, 1960, Ser. No. 38,440
Claims priority, application Mexico Sept. 7, 1959
27 Claims. (Cl. 260—397.5)

The present invention relates to novel cyclopentanophenanthrene derivatives and to a process for the production thereof.

More particularly the present invention relates to 4,4-dialkyl- and 4,4-diaralkyl-3β,17-β-dihydroxyandrostanes, to the 19-nor compounds and to esters thereof which may also contain an alkyl substituent at C–17α and a double bond at C–5,6.

The novel compounds of the present invention which are hormones of the androgenic type have a high ratio of anabolic to androgenic activities and exhibit anti-estrogenic, anti-androgenic and anti-gonadotrophic activity as well as exhibit an antagonistic effect towards acne, are represented by the following formulas:

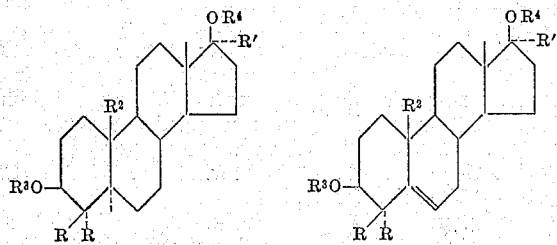

In the above formulas, R represents an alkyl group containing from 1 to 8 carbon atoms or an aralkyl group containing up to 8 carbon atoms; R' represents hydrogen or an alkyl group containing from 1 to 8 carbon atoms; $R^2$ represents hydrogen or methyl; $R^3$ and $R^4$ represent hydrogen or the acyl group of a hydrocarbon carboxylic acid containing up to 12 carbon atoms, saturated or unsaturated, of straight, branched, cyclic or cyclic-aliphatic chain, which may be substituted with groups such as hydroxyl, acyloxy of up to 12 carbon atoms, alkoxy of up to 8 carbon atoms, amino or halogen. Typical ester groups are the acetate, propionate, butyrate, hemisuccinate, caproate, aminoacetate, trimethylacetate, benzoate, cyclopentylpropionate and β-chloropropionate.

The novel compounds of the present invention may be prepared by reacting testosterone or a 17α-lower alkyl-testosterone or the corresponding 19-nor compounds with an alkyl or aralkyl iodide in a tertiary alcohol in the presence of a potassium tertiary alkoxide to form the corresponding 4,4-dialkyl or 4,4-diaralkyl derivative which upon hydrogenation in the presence of a hydrogenation catalyst is transformed into the corresponding 4,4-dialkyl- or 4,4-diaralkyl androstane derivative. Upon reduction of the 4,4-di-substituted-Δ⁵-androstene or androstane compounds with a reducing agent such as sodium borohydride, there is formed the corresponding novel 3β-hydroxy-4,4-di-substituted-Δ⁵-androstene or androstane compound.

The novel compounds of the present invention may be prepared by a process illustrated by the following equation:

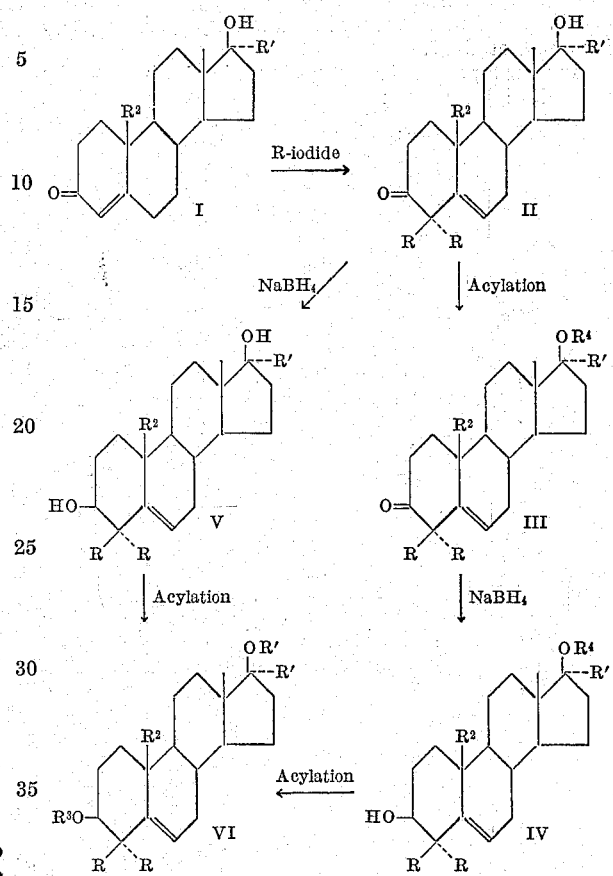

In the above formulas, R, R', $R_2$, $R_3$ and $R_4$ have the same meaning as set forth previously.

In practicing the process outlined above, testosterone, 19-nor-testosterone or the 17α-lower alkyl derivatives thereof such as 17α-methyl, 17α-ethyl-, 17α-propyl-testosterone or 17α-methyl-, 17α-ethyl-, 17α-propyl-19-nor-testosterone (I) is added to a tertiary alcohol solution of potassium metal. There is then added a lower alkyl iodide such as methyl iodide or an aralkyl iodide such as benzyl iodide and the mixture is stirred at room temperature for a period of time of the order of four hours under an atomsphere of nitrogen. The reaction mixture is then poured into water, the organic solvent is removed by vacuum distillation and the precipitate purified to give the corresponding 4,4-di-lower alkyl or 4,4-diaralkyl-Δ⁵-androsten-17β-ol-3-one or the 17α-lower alkyl derivatives thereof or the corresponding 19-nor-derivatives (II).

Conventional esterification of the 4,4-di-substituted-Δ⁵-androsten-17β-ol-3-ones or their 19-nor-derivatives give the corresponding 17-esters of hydrocarbon carboxylic acids of less than 12 carbon atoms (III; R'=hydrogen). Esterification of the corresponding 17α-lower alkyl derivatives of 4,4-disubstituted-Δ⁵-androsten-17β-ol-3-ones or of the 19-nor derivatives is effected by heating with the desired hydrocarbon carboxylic acid anhydride in pyridine solution for 24 to 48 hours at about 90° C. or by reacting the steroid with the hydrocarbon carboxylic acid anhydride or chloride in benzene solution in the presence of p-toluenesulfonic acid. The thus formed esters of the 4,4-disubstituted-Δ⁵-androsten-17β-ol-3-ones, or of the corresponding 19-nor-compounds, with or without an alkyl substituent at C–17α (III) are then treated with a reducing agent such as sodium borohydride to form the corresponding 3β-hydroxy compounds (IV) which upon conventional esterification are converted into the 3,17-diesters (VI).

Alternatively, compounds of Formula II are treated with a reducing agent such as sodium borohydride to form the corresponding 3β,17β-diols (V) which upon conventional esterification are transformed into 3,17-diesters (VI) where a secondary hydroxyl group is present at C–17 or into 3-monoesters where a tertiary hydroxyl group is present at C–17.

Another aspect of the present invention is illustrated by the following equation:

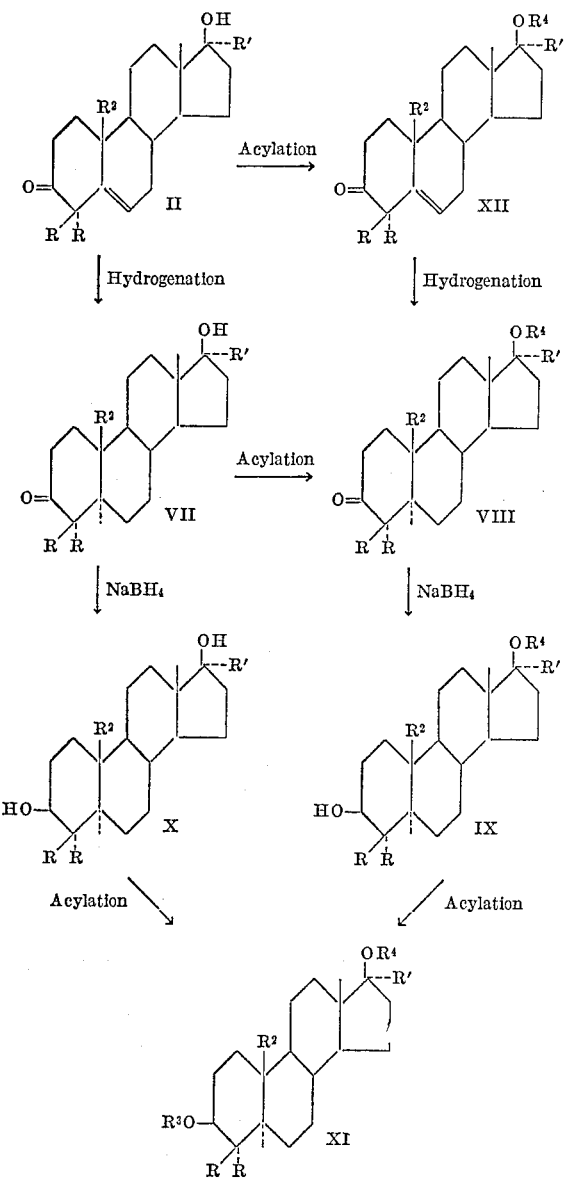

In the above formulas R, R', R², R³ and R⁴ have the same meaning as stated hereinabove.

In this aspect of the invention, the 4,4-disubstituted-Δ⁵-androsten-17β-ol-3-ones, the 19-nor and 17α-alkyl derivatives (II) are hydrogenated in the presence of a hydrogenation catalyst such as palladium until slightly more than 1 equivalent of hydrogen is absorbed to form the corresponding 4,4-disubstituted-androstan-17β-ol-3-ones, 19-nor and 17α-alkyl derivatives (VII), which upon esterification are converted into the corresponding 17-esters (VIII). Treatment of the latter with sodium borohydride results in the formation of the corresponding 3β-hydroxy compounds (IX) which upon conventional esterification are converted into the 3,17-diesters (XI).

Alternatively the 4,4-disubstituted-androstan-17β-ol-3-ones, 19-nor or 17α-alkyl derivatives (VII) are first treated with sodium borohydride to form the corresponding 3β,17β-diols (X) which are then esterified by conventional means to form the 3,17-diesters where a secondary hydroxyl group is present at C–17 (XI; R³=R⁴=acyl), or into the 3-monoesters where a tertiary hydroxyl group is present at C–17 (XI; R³=acyl; R⁴=hydrogen).

By first acylating the 4,4-disubstituted-Δ⁵-androsten-17β-ol-3-one compounds (II) by conventional means where a secondary hydroxyl group is present at C–17 or by treatment of the steroid with the acyl anhydride in benzene in the presence of p-toluenesulfonic acid where a tertiary hydroxyl group is present at C–17, there is first formed the corresponding 17-esters (XII) which upon hydrogenation in the presence of a hydrogenation catalyst are converted into compounds of Formula VIII, which may then be transformed into the 3β-diol compounds (IX) by treatment with sodium borohydride and finally esterified to form the 3,17-diesters (XI).

This application is a continuation-in-part of our copending applications Serial No. 641,038 filed February 19, 1957, and Serial No. 702,761, filed December 16, 1957.

The following examples serve to illustrate but are not intended to limit the scope of the invention.

Example I 2 g. of potassium metal was dissolved in 100 cc. of t-butanol, under an atmosphere of nitrogen. 5 g. of testosterone was added to the solution and when it had dissolved, there was added 6.5 cc. of methyl iodide and the mixture was stirred at room temperature for 4 hours under an atmosphere of nitrogen. It was then poured into water, the organic solvent was removed by vacuum distillation and the precipitate was collected and washed to neutral. Crystallization from acetone afforded 4,4-dimethyl-Δ⁵-androsten-17β-ol-3-one with M.P. 198–201° C., [α]$_D$ —10° (chloroform).

One gram of 4,4-dimethyl-Δ⁵-androsten-17β-ol-3-one was dissolved in 50 cc. of methanol and mixed with a solution of 200 mg. of sodium borohydride in 5 cc. of water and the mixture was kept standing for 16 hours. It was then poured into a mixture of salt water and ice, the excess of hydride was decomposed by the addition of a few drops of acetic acid and the precipitate was filtered. Crystallization from acetone-hexane afforded 4,4-dimethyl-Δ⁵-androstene-3β,17β-diol with M.P. 216–218° C., [α]$_D$ —82° (ethanol).

This compound exhibited anti-androgenic (chick) and anti-estrogenic (mouse) activity.

Example II

One gram of 4,4-dimethyl-Δ⁵-androsten-17β-ol-3-one was added to a suspension of 300 mg. of 5% palladium on charcoal catalyst previously hydrogenated in 50 cc. of methanol. The compound was hydrogenated at 25° C. and atmospheric pressure until the equivalent of 1.1 moles of hydrogen had been absorbed (3 hours). The catalyst was filtered and the solution evaporated. The residue crystallized from acetone-hexane to give 4,4-dimethyl-androstan-17β-ol-3-one with M.P. 145–147° C., [α]$_D$ —12° (chloroform).

In the same manner as described in Example I, 1 gram of 4,4-dimethyl-androstan-17β-ol-3-one was treated with sodium borohydride. After the usual work, there was formed 4,4-dimethyl-androstane-3β,17β-diol with M.P. 245–247° C., [α]$_D$ —16° (ethanol).

Example III

Under an atmosphere of nitrogen there was dissolved 2 g. of potassium metal in 100 cc. of t-butanol and then 5 g. of 17α-methyl-testosterone; there was then added 6.5 cc. of methyl iodide and the mixture was stirred at room temperature for 4 hours under an atmosphere of nitrogen. After pouring into water the organic solvent was removed by distillation under reduced pressure and the precipitate was collected by filtration, washed to neutral and purified by recrystallization from acetone, thus yielding 4,4,17α-trimethyl-Δ⁵-androsten-17β-ol-3-one; M.P. 190–194° C., and upon recrystallization from acetone, M.P. 194–196° C.; [α]$_D$ —35° (chloroform).

2 g. of the above compound was added to a suspension of 600 mg. of a 5% palladium on charcoal catalyst previously hydrogenated in 100 cc. of methanol and the mixture was hydrogenated at 25° C. and atmospheric pressure, until the uptake of 1.1 molar equivalents of hydrogen (3 hours). The catalyst was removed by filtration and the solution was evaporated. Crystallization of the residue from acetone-hexane afforded 4,4,17α-trimethyl-androstan-17β-ol-3-one; M.P. 183–185° C.; [α]$_D$ —39° (chloroform).

To a solution of 1 g. of the above compound in 50 cc. of methanol was added a solution of 200 mg. of sodium borohydride in 5 cc. of water and the mixture was kept at room temperature for 24 hours. The excess of hydride was decomposed by the cautious addition of acetic acid and the mixture was concentrated under reduced pressure to a small volume, and diluted with water until complete precipitation; the product was collected, washed with water, dried and recrystallized from acetone-hexane, thus affording 4,4,17α-trimethyl-androstane-3β,17β-diol; M.P. 230–234° C.; [α]$_D$ —28° (ethanol).

In a similar manner, there was treated 1 g. of the 4,4,17α - trimethyl - Δ⁵ - androsten - 17β-ol-3-one with sodium borohydride to produce 4,4,17α-trimethyl-Δ⁵-androstene-3β,17β-diol; M.P. 216–220° C.; [α]$_D$ —100° (ethanol).

Example IV 2 g. of potassium metal was dissolved in 100 cc. of t-butanol under an atmosphere of nitrogen, 5 g. of 19-nor-testosterone was added to the solution and when it had dissolved, there was added 6.5 cc. of methyl iodide and the mixture was stirred at room temperature for 4 hours under an atmosphere of nitrogen. It was then poured into water, the organic solvent was removed by vacuum distillation and the precipitate was collected and washed to neutral. Crystallization from acetone afforded 4,4-dimethyl-19-nor-Δ⁵-androsten-17β-ol-3-one.

One gram of 4,4-dimethyl-19-nor-Δ⁵-androsten-17β-ol-3-one was added to a suspension of 300 mg. of 5% palladium on charcoal catalyst previously hydrogenated in 50 cc. of methanol. The compound was hydrogenated at 25° C. and atmospheric pressure until the equivalent of 1.1 mols of hydrogen had been absorbed (3 hours). The catalyst was filtered and the solution evaporated. The residue crystallized from acetone-hexane to give 4,4-dimethyl-19-nor-androstan-17β-ol-3-one.

One gram of 4,4-dimethyl-19-nor-androstan-17β-ol-3-one was dissolved in 50 cc. of methanol and mixed with a solution of 200 mg. of sodium borohydride in 5 cc. of water and the mixture was kept standing for 16 hours. It was then poured into a mixture of salt water and ice, the excess of hydride was decomposed by the addition of a few drops of acetic acid and the precipitate was filtered. Crystallization from acetone-hexane afforded 4,4-dimethyl-19-nor-androstane-3β,17β-diol.

In a similar manner, 4,4-dimethyl-19-nor-Δ⁵-androsten-17β-ol-3-one, described above, was treated with sodium borohydride to produce 4,4-dimethyl-19-nor-Δ⁵-androsten-3β,17β-diol.

Example V 5 g. of 17α-methyl-19-nor-testosterone was treated in exactly the same way as described in the preceding example for 19-nor-testosterone thus giving 4,4,17α-trimethyl-19-nor-Δ⁵-androsten-17β-ol-3-one, which upon hydrogenation in the manner described in such example was converted into 4,4,17α - trimethyl-19-nor-androstan-17β-ol-3-one.

Upon treatment of 4,4,17α-trimethyl-19-nor-Δ⁵-androsten-17β-ol-3-one and 4,4,17α-trimethyl-androstan-17β-ol-3-one with sodium borohydride as described in the preceding example, there were afforded 4,4,17α-trimethyl-19-nor-Δ⁵-androstene - 3β,17β-diol and 4,4,17α-trimetnyl-19-nor-androstane-3β,17β-diol.

Example VI

When in the previous examples the methyl iodide was substituted by ethyl iodide, there was obtained 4,4-diethyl-Δ⁵-androsten-17β-ol-3-one, 4,4-diethyl-androstan-17β-ol-3-one, 4,4-diethyl - Δ⁵ - androstene-3β,17β-diol, 4,4-diethyl-androstane-3β,17β-diol-4,4-diethyl - 17α-methyl-Δ⁵-androsten-17β-ol-3-one, 4,4-diethyl - 17α-methyl-androstan-17β-ol-3-one, 4,4-diethyl - 17α - methyl-Δ⁵-androstene-3β,17β-diol-4,4-diethyl - 17α - methyl-androstane-3β,17β-diol and the corresponding 19-nor-derivatives of all of the foregoing.

Example VII

By substituting in the method of the preceding examples the methyl or ethyl iodide by propyl iodide there were obtained 4,4-dipropyl - Δ⁵ - androsten - 17α-ol-3-one, 4,4-dipropyl-androstan-17β-ol-3-one, 4,4-dipropyl-Δ⁵-androstene-3β,17β-diol, 4,4-dipropyl - androstane-3β,17β-diol, 4,4-dipropyl-17α-methyl-Δ⁵-androsten - 17β-ol-3-one, 4,4-dipropyl-17α-methyl-androstan-17β-ol-3-one, 4,4-dipropyl-17α-methyl-Δ⁵-androstene - 3β,17β-diol, 4,4-dipropyl-17α-methyl-androstane-3β,17β-diol and the corresponding 19-nor derivatives of all of the foregoing.

Example VIII

By substituting in the method of the preceding examples the methyl, ethyl, or propyl iodides by benzyl iodide, there were obtained 4,4-dibenzyl-Δ⁵-androsten-17β - ol - 3 - one, 4,4-dibenzyl-androstan-17β-ol-3-one, 4,4-dibenzyl-Δ⁵ - androstene-3β,17β-diol, 4,4-dibenzyl-androstane-3β,17β-diol, 4,4-dibenzyl-17α-methyl-Δ⁵-androsten-17β-ol - 3 - one, 4,4-dibenzyl-17α-methyl-androstan-17β-ol-3-one, 4,4-dibenzyl-17α-methyl-Δ⁵-androstene-3β,17β-diol, 4,4-dibenzyl - 17α-methyl-androstane-3β,17β-diol and the corresponding 19-nor derivatives of all of the foregoing.

Example IX

By substituting in the method of the previous examples 17α-ethyl testosterone there was obtained the 17α-ethyl derivatives of Δ⁵-androsten-17β-ol-3-one, of androstane-17β-ol-3-one, of Δ⁵-androstene-3β,17β-diol and of androstane-3β,17β-diol having two methyl, two propyl, two ethyl or two benzyl groups at C–4.

Example X

By substituting the 17α-ethyl-testosterone of the preceding example by 17α-propyl-testosterone, the corresponding 17α-propyl derivatives were obtained.

Example XI

By substituting the 17α-ethyl-tesosterone and 17α-propyl-testosterone in the previous Examples IX and X by 17α-ethyl-19-nor-testosterone and 17α-propyl-19-nor-testosterone, the corresponding 4,4 - dimethyl - 17α - ethyl, 4,4,17α-triethyl, 4,4-dipropyl-17α-ethyl, 4,4-dibenzyl-17α-ethyl and the corresponding 17α-propyl derivatives of 19-nor-Δ⁵-androsten-17β-ol-3-one, 19-nor-androstan-17β - ol-3-one, 19-nor-Δ⁵-androstene-3β,17β-diol and 19 - nor - androstane-3β,17β-diol were obtained.

Example XII

To a solution of 5 g. of 4,4,17α-trimethyl-Δ⁵-androsten-17β-ol-3-one (obtained in Example III) in 30 cc. of pyridine was added 5 cc. of acetic anhydride and the solution was heated at 90° C. for 24 hours. It was then poured into water, heated on the steam bath for a short time, cooled and the precipitate was collected, thus giving the acetate of 4,4,17α-trimethyl-Δ⁵-androsten-17β - ol - 3 - one which was washed with water, dried and purified by recrystallization from acetone-hexane.

1.0 g. of the latter was then hydrogenated by the method described in Example II to produce 4,4,17α-trimethyl-17β-acetoxy-androstan-3-one. By following the method described in Example I, the latter was treated with sodium borohydride to produce the 17-acetate of 4,4,17α-trimethyl-androstane-3β,17β-diol; in order to avoid the hydrolysis of the acetoxy group at C–17β, there was employed as a solvent tetrahydrofuran instead of methanol and the mixture was allowed to react at room temperature for only 8 hours.

*Example XIII*

By following the method described in Example I, the acetate of 4,4,17α-trimethyl-Δ⁵-androsten-17β-ol-3-one described in the preceding example was reduced to the 17-acetate of 4,4,17α-trimethyl-Δ⁵-androstene-3β,17β-diol.

*Example XIV*

A solution of 5 g. of 4,4-dimethyl-17α-ethyl-Δ⁵-androsten-17β-ol-3-one (described in Example IX) in 50 cc. of dry benzene free of thiophene was treated with 5 cc. of propionic anhydride in the presence of 1.5 g. of p-toluene-sulfonic acid and kept at room temperature for 24 hours. The benzene solution was then successively washed with 5% aqueous sodium carbonate solution, dilute hydrochloric acid and water, dried over anhydrous sodium sulfate and evaporated. Recrystallization of the residue from acetone-hexane furnished the propionate of 4,4-dimethyl-17α-ethyl-Δ⁵-androsten-17β-ol-3-one.

*Example XV*

5 cc. of acetic anhydride was added to a solution of 5 g. of 4,4,17α-trimethyl-androsten-17β-ol-3-one (described in Example III) in 30 cc. of pyridine and the solution was heated at 90° C. for 24 hours. After pouring into water, heating on the steam bath for a short period of time and cooling, the precipitate was collected, and worked up as described in Example XII to form the acetate of 4,4,17α-trimethyl-androstane-17β-ol-3-one.

Treatment of the latter compound with sodium borohydride as described in Example I afforded the acetate of 4,4,17α-trimethyl-androstane-3β,17β - diol identical with the product of Example XII.

*Example XVI*

In accordance with the method described in Example XIV, there was treated 1.0 g. of 4,4,17α-trimethyl-19-nor-androstan-17β-ol-3-one in benzene in the presence of p-toluenesulfonic acid with cyclopentylpropionic anhydride instead of propionic anhydride, extending the reaction time to 3 days and purifying the crude product by chromatography on neutral alumina. There was thus obtained the cyclopentylpropionate of 4,4,17α-trimethyl-19-nor-androstan-17β-ol-3-one.

*Example XVII*

The method of Examples XII and XIV were applied to the 4,4,17α-trimethyl, 4,4-dimethyl-17α-ethyl, 4,4-dimethyl-17α-propyl, 4,4-diethyl-17α - methyl, 4,4,17α - triethyl, 4,4-diethyl-17α-propyl, 4,4-dipropyl-17α-methyl, 4,4 - dipropyl-17α-ethyl, 4,4,17α - tripropyl, 4,4 - dibenzyl - 17α-methyl, 4,4-dibenzyl-17α - ethyl and 4,4 - dibenzyl - 17α-propyl derivative of Δ⁵-androsten-17β-ol-3-one, of androstan-17β-ol-3-one, of 19-nor-Δ⁵-androsten-17β-ol - 3 - one and of 19-nor-androstan-17β-ol-3-one obtained in the previous examples and there were thus obtained the 17-acetates and 17-propionates of the foregoing compounds.

By reduction of the thus formed 17-esters with sodium borohydride in accordance with the method described in Example I, there were formed the corresponding 17-esters of the thus obtained 3β, 17β-diols.

*Example XVIII*

By substituting hydrocarbon carboxylic acid anhydrides other than acetic anhydride and propionic anhydride in the method of the preceding example, there were obtained esters other than the acetates and propionates of the compounds set forth therein. Among other esters, there were thus prepared the caproates, benzoates and cyclopentylpropionates.

*Example XIX*

1 g. of the 17-propionate of 4,4-dibenzyl-17α-ethyl-androstane-3β,17β-diol (Example XVII) in 10 cc. of pyridine was treated with 1 cc. of acetic anhydride and kept overnight at room temperature; it was then poured into water, heated on the steam bath for half an hour, cooled and the precipitate was collected, washed with water and dried. Recrystallization from acetone-hexane furnished the 3-acetate-17-propionate of 4,4-dibenzyl-17α-ethyl-androstane-3β,17β-diol.

*Example XX*

1 g. of 4,4,17α-trimethyl-Δ⁵-androstene-3β,17β-diol (Example III) was treated with propionic anhydride in benzene and in the presence of p-toluenesulfonic acid, in accordance with the method described in Example XII, to produce the dipropionate of 4,4,17-trimethyl-Δ⁵-androstene-3β,17β-diol.

*Example XXI*

By substituting in the method of the preceding Example the 4,4,17α-trimethyl-Δ⁵-androstene-3β,17β-diol by the 4,4,17α-trimethyl-androstane-3β,17β-diol as well as the propionic anhydride by acetic anhydride, there was obtained the diacetate of 4,4,17α-trimethyl-androstane-3β,17β-diol.

A mixture of 1 g. of the above compound and 50 cc. of 2% methanolic sodium hydroxide solution was kept at room temperature for 4 hours, acidified with acetic acid, concentrated to a small amount under reduced pressure and the product was precipitated by diluting with water. The product was collected by filtration, washed with water, dried and recrystallized from acetone-hexane, thus affording the 17-monoacetate of 4,4,17α-trimethyl-androstane-3β,17β-diol.

*Example XXII*

By substituting in the preceding example propionic anhydride for the acetic anhydride, there were formed the dipropionate of 4,4,17α-trimethyl-androstane-3β,17β-diol.

*Example XXIII*

By following the methods of Examples XIX and XXI, there were formed the 3-acetate-17-benzoate of 4,4,17α-trimethyl-androstane-3β,17β-diol; the acetate, trimethylacetate and aminoacetate of 4,4-dimethyl-17α-ethyl-Δ⁵-androsten-17β-ol-3-one and the diacetate of 4,4-dimethyl-17α-ethyl-Δ⁵-androstene-3β,17β-diol.

Similarly the 4,4-dimethyl-17α-ethyl, 4,4,17α-triethyl, 4,4-dibenzyl-17α-methyl and 4,4-dibenzyl-17α-ethyl derivatives of Δ⁵-androstene-3β,17β-diol-, of androstane-3β, 17β-diol, of 19-nor-androstane-3β,17β-diol, and of 19-nor-Δ⁵-androstene-3β,17β-diol were esterified to form the diacetates, dipropionates, dicyclopentylpropionates, 3-acetates-17-propionates, 3-acetates-17-cyclopentylpropionates, 3 - propionates - 17-acetates and 3-propionates-17-cyclopentylpropionates.

*Example XXIV*

By conventional reaction with acetic anhydride in pyridine there was prepared the 17-acetates of 4,4-dimethyl-Δ⁵-androsten-17β-ol-3-one, 4,4-dimethylandrostan-17β-ol-3-one, 4,4-dimethyl-19-nor-Δ⁵-androsten-17β-ol-3-one, 4,4-dimethyl-19-nor-androstan-17β-ol-3-one and of the corresponding 4,4-diethyl, 4,4-dipropyl and 4,4-dibenzyl compounds.

In a similar conventional manner there was also produced other esters such as the propionates, benzoates and cyclopentylpropionates.

*Example XXV*

By conventional reaction with acetic anhydride in pyridine, there was prepared the 3,17-diacetate derivatives of 4,4-dimethyl-Δ⁵-androstene-3β,17β-diol, 4,4-dimethyl-androstane-3β,17β-diol, 4,4-dimethyl-19-nor-Δ⁵-androstene-3β,17β-diol and of 4,4-dimethyl-19-nor-androstane-3β,17β-diol.

In a similar manner there was also prepared other esters such as the dipropionates, dibenzoates and dicyclopentylpropionates.

*Example XXVI*

By substituting the 4,4-diethyl, 4,4-dipropyl and 4,4-dibenzyl derivatives in the methods of examples XXIV and XXV, there were prepared the corresponding esters and diesters of such 4,4-disubstituted compounds.

We claim:
1. A compound of the following formula:

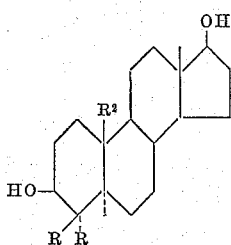

wherein R is selected from the group consisting of alkyl and aralkyl radicals containing up to 8 carbon atoms and $R^2$ is selected from the group consisting of hydrogen and methyl.

2. 4,4-di-lower alkyl-androstane-3β,17β-diol.
3. 4,4-dimethyl-androstane-3β,17β-diol.
4. 4,4-di-lower alkyl-19-nor-androstane-3β,17β-diol.
5. 4,4-dimethyl-19-nor-androstane-3β,17β-diol.
6. A compound of the following formula:

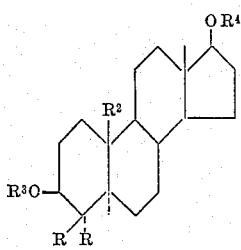

wherein R is selected from the group consisting of alkyl and aralkyl radicals containing up to 8 carbon atoms; $R^2$ is selected from the group consisting of hydrogen and methyl; $R^3$ is selected from the group consisting of hydrogen and a hydrocarbon carboxylic acyl group of less than 12 carbon atoms and $R^4$ is a hydrocarbon carboxylic acyl group of less than 12 carbon atoms.

7. 4,4-dimethyl-androstane-3β,17β-diol-diacetate.
8. 4,4-dimethyl-19-nor-androstane-3β,17β-diol-diacetate.
9. A compound of the following formula:

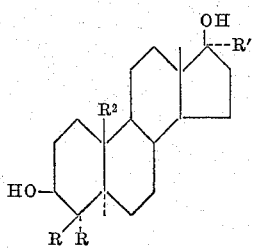

wherein R is selected from the group consisting of alkyl and aralkyl radicals containing up to 8 carbon atoms; R′ is an alkyl group containing up to 8 carbon atoms; and $R^2$ is selected from the group consisting of hydrogen and methyl.

10. 4,4,17α-tri-lower alkyl-androstane-3β,17β-diol.
11. 4,4,17α-trimethyl-androstane-3β,17β-diol.
12. 4,4,17α-tri-lower alkyl-19-nor-androstane-3β,17β-diol.
13. A compound of the following formula:

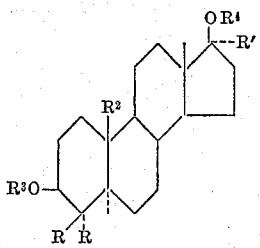

wherein R is selected from the group consisting of alkyl and aralkyl radicals containing up to 8 carbon atoms; R′ is an alkyl group containing up to 8 carbon atoms; $R^2$ is selected from the group consisting of hydrogen and methyl; and $R^3$ and $R^4$ are selected from the group consisting of hydrogen and a hydrocarbon carboxylic acyl group of less than 12 carbon atoms and at least one of $R^3$ and $R^4$ is other than hydrogen.

14. 4,4,17α-trimethyl-androstane-3β,17β-diol-17-acetate.
15. A compound of the following formula:

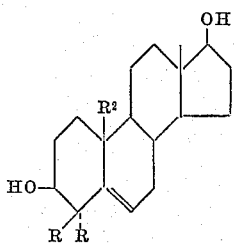

wherein R is selected from the group consisting of alkyl and aralkyl radicals containing up to 8 carbon atoms, and $R^2$ is selected from the group consisting of hydrogen and methyl.

16. 4,4-di-lower alkyl-Δ⁵-androstene-3β,17β-diol.
17. 4,4-dimethyl-Δ⁵-androstene-3β,17β-diol.
18. 4,4-di-lower alkyl-19-nor-Δ⁵-androstene-3β,17β-diol.
19. 4,4-dimethyl-19-nor-Δ⁵-androstene-3β,17β-diol.
20. A compound of the following formula:

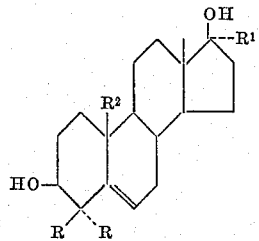

wherein R is selected from the group consisting of alkyl and aralkyl radicals containing up to 8 carbon atoms; R′ is an alkyl group containing up to 8 carbon atoms; and $R^2$ is selected from the group consisting of hydrogen and methyl.

21. 4,4,17α-tri-lower alkyl-Δ⁵-androstene-3β,17β-diol.
22. 4,4,17α-trimethyl-Δ⁵-androstene-3β,17β-diol.
23. 4,4,17α-tri-lower alkyl-19-nor-Δ⁵-androstene-3β,17β-diol.
24. 4,4,17α-trimethyl-19-nor-Δ⁵-androstene-3β,17β-diol.

25. A compound of the following formula:

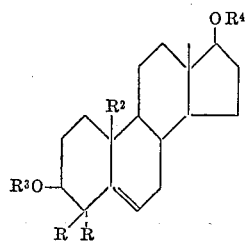

wherein R is selected from the group consisting of alkyl and aralkyl radicals containing up to 8 carbon atoms; $R^2$ is selected from the group consisting of hydrogen and methyl; and $R^3$ is selected from the group consisting of hydrogen and a hydrocarbon carboxylic acyl group of less than 12 carbon atoms; and $R^4$ is a hydrocarbon carboxylic acyl grorup of less than 12 carbon atoms.

26. 4,4 - dimethyl - $\Delta^5$ - androstene - $3\beta,17\beta$ - diol-3-acetate-17-propionate.

27. 4,4 - dimethyl - 19 - nor - $\Delta^5$ - androstene - $3\beta, 17\beta$-diol-17-acetate.

No references cited.